United States Patent [19]

Tomatis

[11] Patent Number: 4,679,497
[45] Date of Patent: Jul. 14, 1987

[54] CHEESE HARDENING MACHINE FOR PASTA FILATA CHEESE

[76] Inventor: Stefano Tomatis, via Provinciale 141, 12010 San Lorenzo di Peveragno (Cuneo), Italy

[21] Appl. No.: 777,348

[22] Filed: Sep. 18, 1985

[30] Foreign Application Priority Data

Sep. 25, 1984 [IT] Italy ............................ 67953 A/84

[51] Int. Cl.$^4$ ............................................ A01J 25/00
[52] U.S. Cl. ........................................ 99/455; 99/452; 99/460
[58] Field of Search .................... 99/452–455, 99/456, 458, 459, 460, 461, 464–466, 516, 517; 426/36, 582

[56] References Cited

U.S. PATENT DOCUMENTS 3,570,389  3/1971  Pontecorvo et al. ................ 99/455
4,108,057  8/1978  Hain et al. ........................... 99/452
4,306,493  12/1981 Hain et al. ....................... 99/465 X Primary Examiner—Timothy F. Simone
Attorney, Agent, or Firm—Cushman, Darby & Cushman

[57] ABSTRACT

A cheese hardening machine for pasta filata eheese, such as mozzarella and the like, comprises an elongated, open-top vat adapted to be filled with water up to a predetermined level, and having a loading end and a delivery end; a tube connecting said loading end and said delivery end of the vat, running below said predetermined level; a turbine in the tube, adapted to be driven by motor means for propelling the water in the tube with turbulent flow from the delivery end to the loading end; continuous shovel means slowly sweeping the vat bottom from the loading end to the delivery end; loading means for continuously loading cheese at the loading end of the vat; and extractor means for continuously extracting cheese from the delivery end of the vat.

8 Claims, 4 Drawing Figures

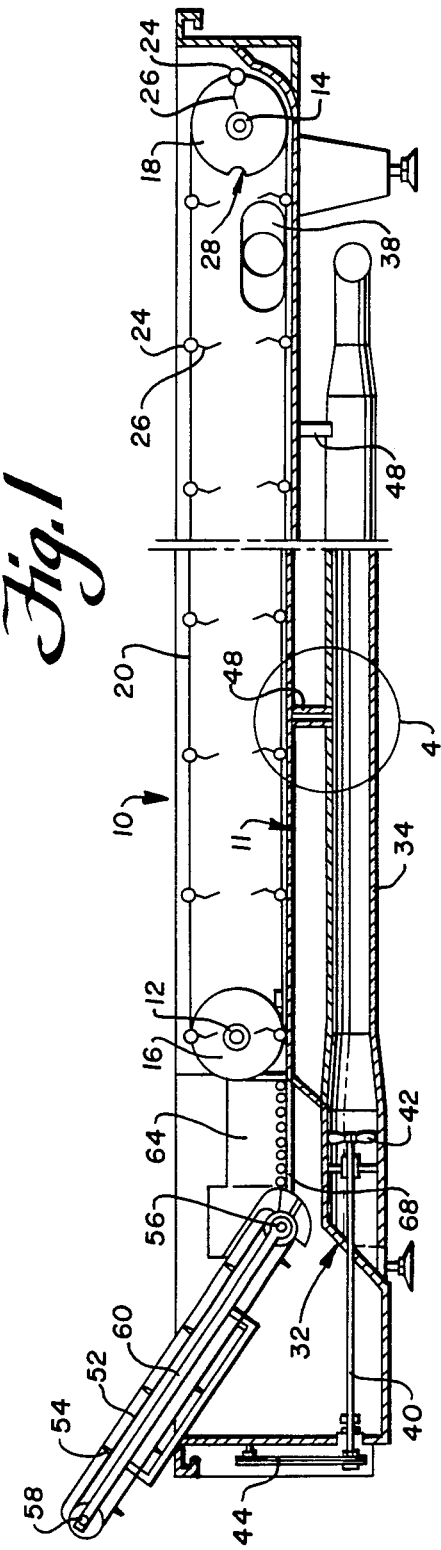
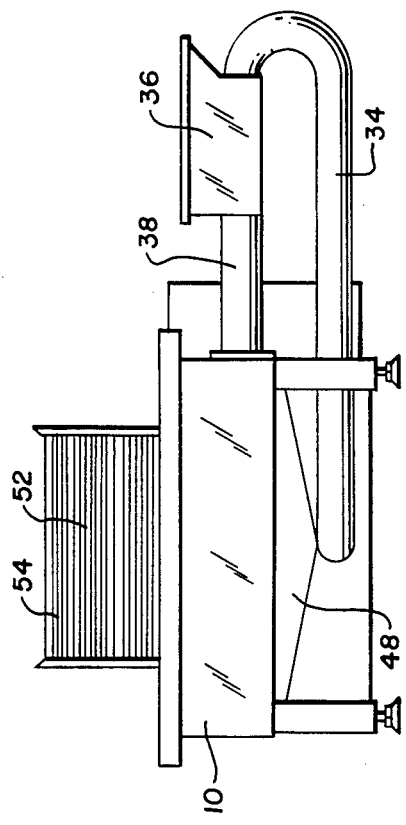

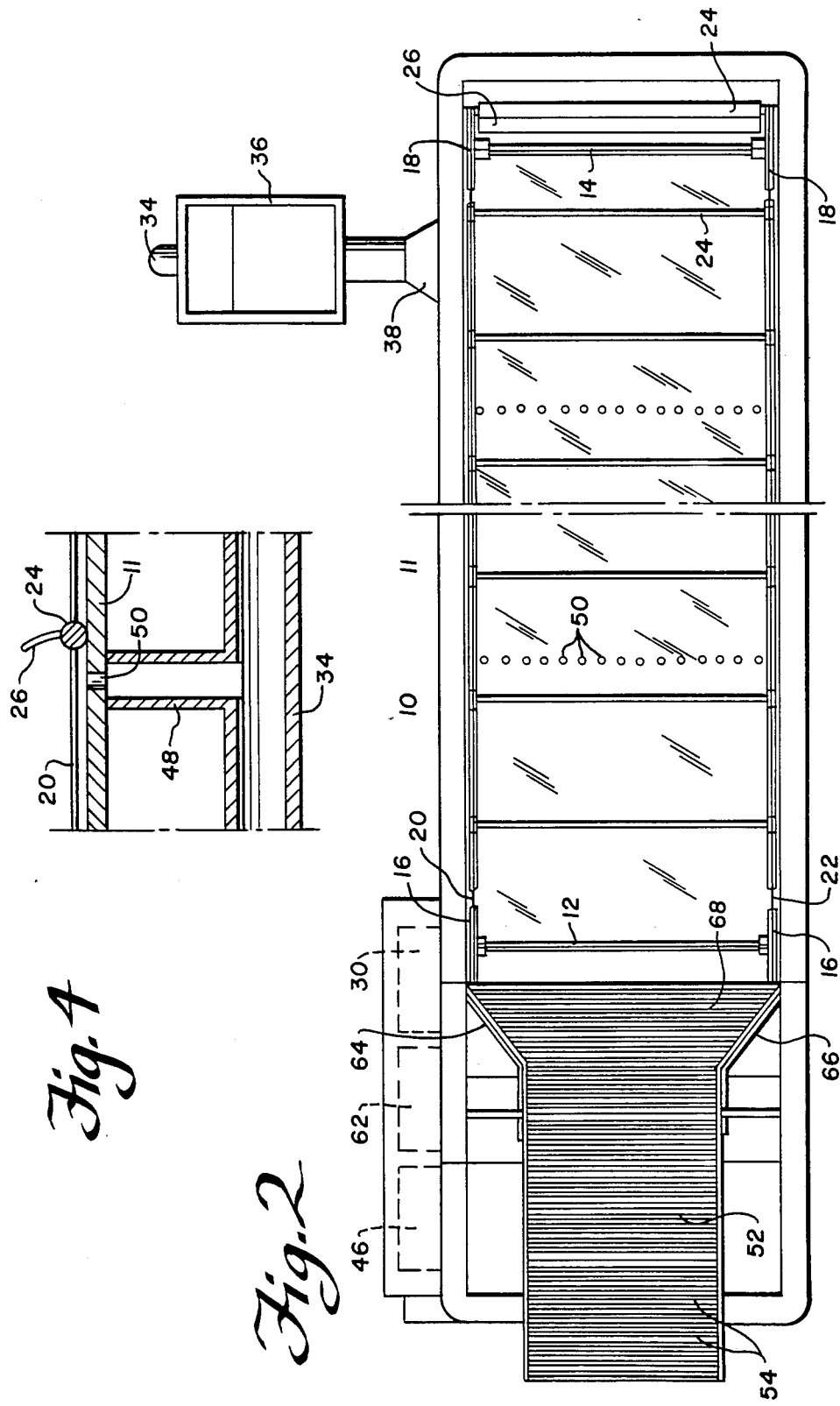

4,679,497

CHEESE HARDENING MACHINE FOR PASTA FILATA CHEESE

BACKGROUND OF THE INVENTION

This invention is concerned with a cheese hardening machine, for hardening mozzarella, scamorza, provolone and other kinds of pasta filata cheese.

Freshly molded mozzarella cheeses are, as known in the art, soft and malleable and have to be hardened by immersion in cold water for a period sufficient to completely chill their mass. Fast chilling can only be achieved if the product is kept moving with respect to the water. Moreover, individual mozzarella balls or knobs should not be crowded, so that they are not squeezed together and become misshapen. Therefore, mechanized chilling vats were first provided, where the freshly molded product is horizontally transported through cold water on a conveyor belt and is then mechanically withdrawn at the delivery end of the vat. The length of the vat and the conveyor travel speed are suitably chosen in order to obtain the required immersion time. The product thereby moves with respect to the water, it does not become crowded, and it is not scraped by sliding against the surfaces of the vat.

However, in this type of hardening machines the product lies on the conveyor belt in the same position during the entire run through the vat, so that, even if the mozzarella balls are not squeezed, they are deformed by the force of gravity acting in the same direction for the entire immersion time, while the product is still plastic, and, on the other hand, the portion of the cheese surface that is in contact with the belt is not subjected to the same chilling action as the portion of the surface that is in direct contact with the cold water. The finished product is therefore flattened and its surface is uneven in texture or color.

Moreover, with such prior chilling vats, it is difficult or impossible to reach the area of the vat underneath the belt for cleaning, unless the entire belt-supporting structure is lifted out by means of bulky and expensive mechanical gear.

Prior Italian published patent application No. 67683-A/78, filed on Mar. 28, 1978, discloses a cheese hardening vat having a set of short, overlapping conveyor belts, which cause the cheeses to roll over in passing from one belt to the next, so that the cheese is neither flattened nor unevenly chilled. Moreover, each belt-support structure in such prior chilling vat can be individually upended, so that the area beneath the belts can be easily accessed for cleaning.

Hardening vats with overlapping conveyor belts, however, are mechanically complex, because of the numerous gears and transmissions necessary to propagate motion to all the belts, and because of the separate frames and rollers required for supporting each belt. On the other hand, the problem of cleaning is not fully solved either, because it is still difficult to clean the recesses within each belt structure. Moreover, the plastic material of the belts themselves is often less than satisfactory from the point of view of hygiene.

SUMMARY OF THE INVENTION

It is therefore the main object of the invention to provide a cheese hardening machine for hardening pasta filata cheese such as mozzarella, scamorza, provolone and the like, in such a way that the product is uniformly chilled, while the machine itself is easy to clean.

The invention achieves the above and other object, together with other objects and advantages such as they will appear from the following description, by means of a cheese hardening machine for pasta filata cheese such as mozzarella and the like, comprising an elongated, open-top vat adapted to be filled with water up to a predetermined level, and having a loading end and a delivery end; a tub connecting said loading end and said delivery end of the vat, running below said predetermined level; a turbine in the tube, adapted to be driven by motor means for propelling the water in the tube with turbulent flow from the delivery end to the loading end; continuous shovel means slowly sweeping the vat bottom from the loading end to the delivery end; loading means for continuously loading cheese at the loading end of the vat; and extractor means for continuously extracting cheese from the delivery end of the vat.

BRIEF DESCRIPTION OF THE DRAWINGS

A preferred embodiment of the invention will now be described, by way of example, with reference to the attached drawings, wherein:

FIG. 1 is a view in side elevation, partially broken away, of a hardening machine according to the preferred embodiment;

FIG. 2 is a plan view of the hardening machine of FIG. 1;

FIG. 3 is an end view of the hardening machine of FIG. 1; and

FIG. 4 is a cross-sectional view of a detail of FIG. 2, on an enlarged scale.

DESCRIPTION OF A PREFERRED EMBODIMENT

With reference to the Figures of the drawings, the cheese hardening machine according to the preferred embodiment comprises an open-top vat 10 with a flat bottom 11, having an elongate, rectangular plan outline. Near the ends of the vat, respective shafts 12, 14 are rotatably supported in the vat, transversely to the the vat and parallelly to the bottom 11. Each shaft carries respective pairs of pulleys 16, 18 near opposite side walls of the vat. Respective wire loops 20, 22, say of stainless steel, are engaged on said pulleys near respective side walls, so that, in each loop, a lower stretch of wire runs close to the bottom of the vat, while the upper stretch runs near the upper edge of the vat. Rods such as 24, also of stainless steel, extend transversely between the wires at spaced intervals and are rigidly connected to them. Rods 24 are provided with integral flaps or blade-shaped shovels such as 26. Pulleys 16, 18 are dented as in 28 to accommodate rods 24 as they are drawn around the pulleys. Shaft 12 can be driven at low speed by an electric motor unit 30, including a suitable reduction gear (not shown), so that pulleys 16 are slowly rotated clockwise on FIG. 1 (and consequently also pulleys 18 through the transmission by wires 20, 22) to move the flaps slowly from the loading end to the delivery end, to push forward any objects on the vat bottom in a continuous shovel fashion.

During operation, vat 10 will be filled with cold water to a level intermediate between the upper and lower stretches of wires 20, 22.

At one end, the bottom 11 of vat 10 has a sloping depression 32, and a tube 34, running horizontally under the middle of the vat, opens into such depression. Tube 34 bends outwardly at the opposite end of the vat, and terminates into the end wall of a loading hopper 36. At its opposite wall, hopper 36 communicates with a flared conduit 38, which opens horizontally into a side wall of vat 10.

A turbine 42, preferably similar to a three-blade boat propeller, is rigidly supported on a shaft 40 within tube 34. Shaft 40 is driven at a high speed via a belt transmission 44 by an electric motor 46, in such a direction that, when water fills the vat, and consequently the tube 34 itself, the water is moved in the tube toward its hopper end, i.e. toward the right in the view of FIG. 1.

Tube 34, in its portion underlying vat 10, opens at intervals into several fan-like distributors conduits 48 (see also FIG. 4) leading to respective rows of holes 50 in the vat bottom 11, so that a fraction of the water propelled by turbine 42 is forcefully driven through such holes into the vat, to create a multitude of upward, curtain-like streams, while the main flow of the water enters the hopper 36 and comes back into the vat through flared conduit 38.

An extractor device is mounted above the sloping depression 32.

Such device comprises a chain of linked metal rods 52 (of stainless steel), having spaced ridges 54, driven over rollers or sprockets 56, 58, which in turn are rotatably supported on a slanted frame 60. The lower roller 56 is driven at low speed by a motor unit 62, including a reduction gear not shown, placed outside the vat 10.

Between the end of flat bottom 11 of vat 10 and the base of extractor device 52-60 extends a bridge structure, comprising a pair of converging side walls 64, 66 and a bottom grate 68. Bridge 64-68 is preferably removable for ease of cleaning.

The cheese hardening machine described above further includes ports, in the walls and bottom of vat 10, for adduction, circulation, overflow and drain of water, not shown because substantially the same as in a conventional hardening vat. Such ports should enable, together with conventional external equipment, to fill vat 10 with cold water, circulate it through external cooling means (not shown), maintain a constant water level in the vat, and drain the vat at the end of a work session.

For operation, vat 10 is filled with chilled water (constantly refrigerated through an external circuit) up to said intermediate level. The motors are then operated for driving pulleys 16, turbine 42 and extractor device 52-60. Turbine 42 will then produce a powerful, turbulent water flow in tube 34, and from there into hopper 36 and then out into conduit 38 and back to the vat. Simultaneously, a fraction of the water from tube 34 will stream upwardly through holes 50 to create upward currents in the vat, extending at intervals across the full width of the vat. The water will flow down into the sloping depression 32 through the grate 68 and circulate back to the tube 34 and the turbin 42.

The product to be hardened, say mozzarella balls, are now loaded into the hopper, usually by direct drop from the delivery end of a conventional, continuous molding machine (not shown). The mozzarella balls will be engulfed in the whirling water flowing through the hopper and will be forcefully dragged into conduit 38 and to the vat. Here the mozzarella balls will be engaged by flaps 26, to be slowly pushed along the vat toward its delivery end, and, at the same time, they will be subjected to the turbulent motion of the water in the vat and to the upward currents from holes 50. Such action will lift and shift them around in the water, so that they will roll and float forward, with practically no sliding on the bottom.

When they reach the end of flat bottom 11, the mozzarella balls will be held by grate 68 and will be engaged by extractor belt 52 and its ridges 54, and they will thus be lifted out of the water and delivered to further processing, such as salting or packaging, over the top of the extractor belt.

Since the shape and size of the cheese is not critical for the turbulent-flow operation described above, the cheese hardening machine according to the invention can be used without changes or adaptations with mozzarella balls of a size from a few grams to a few hectograms, and also with different shapes (round, pear-shaped, etc.), such as scamorza, caciocavallo, provola and the like.

The machine can be easily cleaned at the end of a work session, because all transport members (wires with cross rods, pulleys, extractor belt, etc.) are immediately accessible and have a simple, non-intricate structure.

A preferred embodiment of the invention has been described, but it is understood that equivalent changes and modifications can be made in it, within the teachings of the invention and without departing from its scope.

I claim:

1. A cheese hardening machine for pasta filata cheese such as ball-shaped mozzarella, comprising:
    (a) an elongated vat having a loading end and a delivery end and a flat, substantially horizontal bottom, said vat being fillable with water to a predetermined level thereby to provide, in use, a filling of water for said machine;
    (b) tube means connecting said delivery end of said vat to said loading end of said vat, said tube means extending outside the vat below said predetermined level as an outside circulation loop;
    (c) a motor-driven axial turbine interposed in said tube means, said turbine being adapted to withdraw water from said vat at said delivery end, propel, during use, at least some of said withdrawn water, at a high speed from said delivery end to said loading end and to reintroduce thereby recirculated water therefrom into said vat at said loading end, whereby a highly tubulent flow of water is generated in said vat from said loading end to said delivery end;
    (d) shovel means comprising a set of blades extending transversely to said vat near said vat bottom and extending upwardly short of said predetermined level, said shovel means being movable in the direction of net water flow in said vat towards said delivery end of said vat;
    (e) loading means for loading cheese into said vat at said loading end of said vat; and
    (f) extractor means for continuously extracting cheese from said vat at said delivery end of said vat.

2. The cheese hardening machine of claim 1, wherein the bottom of the vat is flat, and said shovel means comprise: two parallel wire loops engaged on respective pairs of pulleys near opposite ends of the vat, so that they form an upper and a lower stretches, at least one pair of pulleys being driven by motor means; a plurality of blade-like shovels extending at spaced intervals across the vat and carried by said wire loops; said predetermined level of water filling being intermediate between the upper and the lower stretches os said wire loops.

3. The cheese hardening machine of claim 1, wherein transversal rows of holes are bored in the vat bottom, and the tube communicates at intervals with fan-like distributor conduits leading to respective rows of said holes.

4. The cheese hardening machine of claim 1, wherein the tube extends mostly horizontally beneath the bottom of the vat.

5. The cheese hardening machine of claim 1, wherein said loading means comprise a hopper communicating with the vat through a flared conduit, the wall of the hopper opposite to said conduit opening to communicate with said tube.

6. The cheese hardening machine of claim 2, wherein the vat bottom has a sloping depression at its delivery end, the tube opening into said depression.

7. The cheese hardening machine of claim 6, wherein the extractor means comprises a conveyor chain obliquely supported above said depression, and a grated bridge extends between the edge of said depression near said flat bottom of the vat and the base of the extractor means.

8. The cheese hardening machine of claim 7, wherein the conveyor chain is made of a plurality of linked metal rods.

* * * * *